(12) United States Patent
Goldman

(10) Patent No.: US 8,037,485 B1
(45) Date of Patent: Oct. 11, 2011

(54) ABSTRACTING DATA ACQUISITION AND MANAGEMENT

(75) Inventor: Oliver Goldman, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1071 days.

(21) Appl. No.: 11/850,004

(22) Filed: Sep. 4, 2007

(51) Int. Cl.
  *G06F 3/00* (2006.01)
  *G06F 13/00* (2006.01)
(52) U.S. Cl. .......................................... 719/328; 710/1
(58) Field of Classification Search .................. 719/328; 710/1
  See application file for complete search history.

(56) References Cited

U.S. PATENT DOCUMENTS

| | | | |
|---|---|---|---|
| 6,687,745 | B1 | 2/2004 | Franco et al. |
| 6,721,738 | B2 | 4/2004 | Verplaetse et al. |
| 7,730,492 | B1 * | 6/2010 | Blaukopf et al. ............. 719/312 |
| 2006/0066601 | A1 * | 3/2006 | Kothari et al. ................ 345/204 |

OTHER PUBLICATIONS

Sony Ericsson, New Java™ Platform 8 (JP-8) phones supporting MSA: K850 Cyber-shot™ and W910 Walkman®, Jun. 15, 2007, printed from Website on Aug. 6, 2007 http://developer.sonyericsson.com/site/global/newsandevents/latestnews/newsjune07/p_k850_w910_newjp8phones.jsp.

* cited by examiner

*Primary Examiner* — Qing Wu
(74) *Attorney, Agent, or Firm* — Fish & Richardson P.C.

(57) ABSTRACT

Methods, systems, and apparatus, including medium-encoded computer program products, for abstracting data acquisition and management. One or more aspects of the subject matter described in this specification can be embodied in one or more methods including: providing a cross-platform application program interface for a software application that runs in an application execution environment running on a computing platform; receiving a request, through the cross-platform application program interface, from the software application for access to a real-time sensor device; and in response to the request, identifying which of multiple predetermined sensor devices is currently available, the identified sensor device being configured to provide real-time data, determining an interval based on information associated with the software application, and providing data derived from the identified sensor device to the software application in accordance with the interval.

25 Claims, 3 Drawing Sheets

ABSTRACTING DATA ACQUISITION AND MANAGEMENT

BACKGROUND

This specification relates to managing device data for software applications in an application execution environment (e.g., a virtual machine or a runtime environment). Application execution environments operate on many computing platforms (e.g., personal computers, laptops, personal digital assistants, smartphones or cellular phones). The variety and prevalence of platforms is increasing while their size and cost is often decreasing. Consequently, there is also strong demand for software that runs on the various platforms.

Computing platforms often include an operating system (OS) (e.g., WINDOWS®, MAC OS®, LINUX®, SYMBIAN OS, MAEMO, PALM® OS or WINDOWS® MOBILE). An operating system is a set of computer programs that manage the hardware and software resources of a computer. An operating system processes raw system and user input and responds by allocating and managing tasks and internal system resources as a service to users and programs of the system. Fundamentally, an operating system performs basic tasks such as controlling and allocating memory, prioritizing system requests, controlling output devices (e.g., audio speakers or visual displays), responding to input devices (e.g., mice, keyboards, styluses, cameras or touch screens), facilitating networking and managing file systems. An operating system also provides an execution environment for which software developers write applications that interact with the system services.

Software developers often write an application in a programming language (e.g., C++) and then compile the application for a specific operating system (e.g., LINUX®). If a software developer compiles an application for an operating system, the application is not generally compatible with a different operating system. To alleviate dependence on a particular operating system, software developers have built application execution environments. The developers create several variants of an execution environment built to run on different operating systems but each variant is capable of running the same applications. An application developer can write one program that will run on each variant without modification or recompiling. Application execution environments often provide a set of services similar to an operating system including interactivity with input devices. Application execution environments include the JAVA® Virtual Machine (JVM) (available from Sun Microsystems, Inc.), ADOBE® FLASH® Player and ADOBE® Integrated Runtime (both available from Adobe Systems Incorporated).

Some input devices connected to a computing platform produce data that is immediately provided after production. The data is known as real-time data and is often continuously provided by the device. For instance, a camera may continually capture image data and immediately provide the data to the system. Other real-time data input devices include accelerometers, Global Positioning System (GPS) receivers, touch screens, microphones, mice, gyroscopes and thermometers. Operating systems commonly allow software applications at least some access to the data the devices produce, and programmers have written programs that access such data. For example, one program on a ThinkPad laptop computer accesses the data generated by an accelerometer device in the laptop to draw a picture of the laptop on the screen and rotate the picture as one rotates the laptop. Another example is a computer having two operating systems, where data from an accelerometer is monitored such that, when a large jolt occurs (e.g., from a person slapping the side of the computer), the computer switches which of the two operating systems is exposed to the user.

SUMMARY

This specification describes technologies relating to abstracting data acquisition and management for software applications running in an application execution environment on a computing platform. In general, one or more aspects of the subject matter described in this specification can be embodied in one or more methods including: providing a cross-platform application program interface for a software application that runs in an application execution environment running on a computing platform; and receiving a request, through the cross-platform application program interface, from the software application for access to a real-time sensor device; and in response to the request, identifying which of multiple predetermined sensor devices is currently available, the identified sensor device being configured to provide real-time data, determining an interval based on information associated with the software application, and providing data derived from the identified sensor device to the software application in accordance with the interval. Other embodiments include corresponding systems, apparatus, and computer program products.

These and other embodiments can optionally include one or more of the following features. Providing the cross-platform application program interface can include providing a software framework that defines at least a portion of the cross-platform application program interface for the application execution environment. The receiving can include receiving a first request from a first instance of the software application, and the method operations can further include receiving a second request from a second instance of the software application, and in response to the second request, identifying which of the multiple predetermined sensor devices is currently available, determining a second interval based on information associated with the second instance of the software application, and providing the data from the identified sensor device to the second instance of the software application in accordance with the second interval.

The identifying can include attempting to load a library that provides a programming interface to the sensor device in the computing platform. The determining can include setting the interval equal to a frame rate associated with the software application. Providing the data can include: polling the identified sensor device at the frame rate; and sending the real-time data to the software application at the frame rate. Each of the multiple predetermined sensor devices can be of the same type (e.g., multiple accelerometers). Moreover, the determining can include: receiving the information including a threshold; and finding an end to the interval when a current value from the sensor device exceeds the threshold.

A system can include a user interface device and one or more computers operable to interact with the user interface device and to perform method operations. The one or more computers can include a server operable to interact with the user interface device through a data communication network, and the user interface device can be operable to interact with the server as a client. The one or more computers can include a personal computer running a web browser or a mobile telephone running a Wireless Application Protocol (WAP) browser. The one or more computers can include one personal computer, and the personal computer can include the user interface device. In addition, the sensor devices can be of different types, the same type, or both.

Particular embodiments of the subject matter described in this specification can be implemented to realize one or more of the following advantages. An application execution environment can obtain real-time data from an input device. The application execution environment can provide access to information, based on the data, to a software application through a cross-platform application program interface. For example, the information based on the data may be a subset of the data, modified data or a computation based on the data. Through the cross-platform application program interface, the execution environment can provide an application access to the information in the same way on various computing platforms running different operating systems.

The application execution environment can provide the information to the software application, freeing the application developer from having to implement data retrieval functionality including polling the input device. The application execution environment can also provide the information automatically and at a regular interval saving the application from additional implementation details. Furthermore, the information can be provided only when a data consumer is able to use the information. Providing information at a rate corresponding to a consumption rate can avoid wasting resources and can help applications to run better, especially on computing platforms with limited resources.

The amount of data produced by an input device can be made manageable by the application execution environment providing only a subset of all the data generated. For example, a gyroscope may continually generate orientation data, and the application execution environment may be able to obtain a data point one million times per second. The software application may, however, only be able to update its displayed information 30 times per second. The execution environment can thus improve performance by providing data points at a rate of 30 times per second.

In addition, the amount of data can be reduced by the application execution environment by only providing information when a predefined situation occurs. For instance, an accelerometer may constantly measure changing acceleration data relative to a mobile device being carried by a person. The application execution environment can make the information manageable by providing the information to the application only when the device is dropped and the accelerometer produces dramatic acceleration data.

The application execution environment can also provide information that is more useful to the application than the data by adjusting the data. Issues such as anomalies in the real-time data input device, inconsistency in the data and lack of utility of raw device data can be accounted for by the application execution environment modifying the data. As an example, the data can be calibrated. An accelerometer may anomalously generate data representing a constant positive acceleration and the application execution environment can provide useful information by adjusting the data to instead reflect zero acceleration.

Furthermore, the application execution environment can provide the application with a broad perspective of the information. The perspective can be provided by the execution environment storing and supplying a set of the data or the information. The execution environment can further provide perspective by supplying calculations over the set. For example, the set may represent a time series over which time series analysis can be performed. Each data point in a time series is typically produced at successive and often uniformly spaced times. The time series analysis can include moving averages, calculations based on stochastic processes, and predictive analysis.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
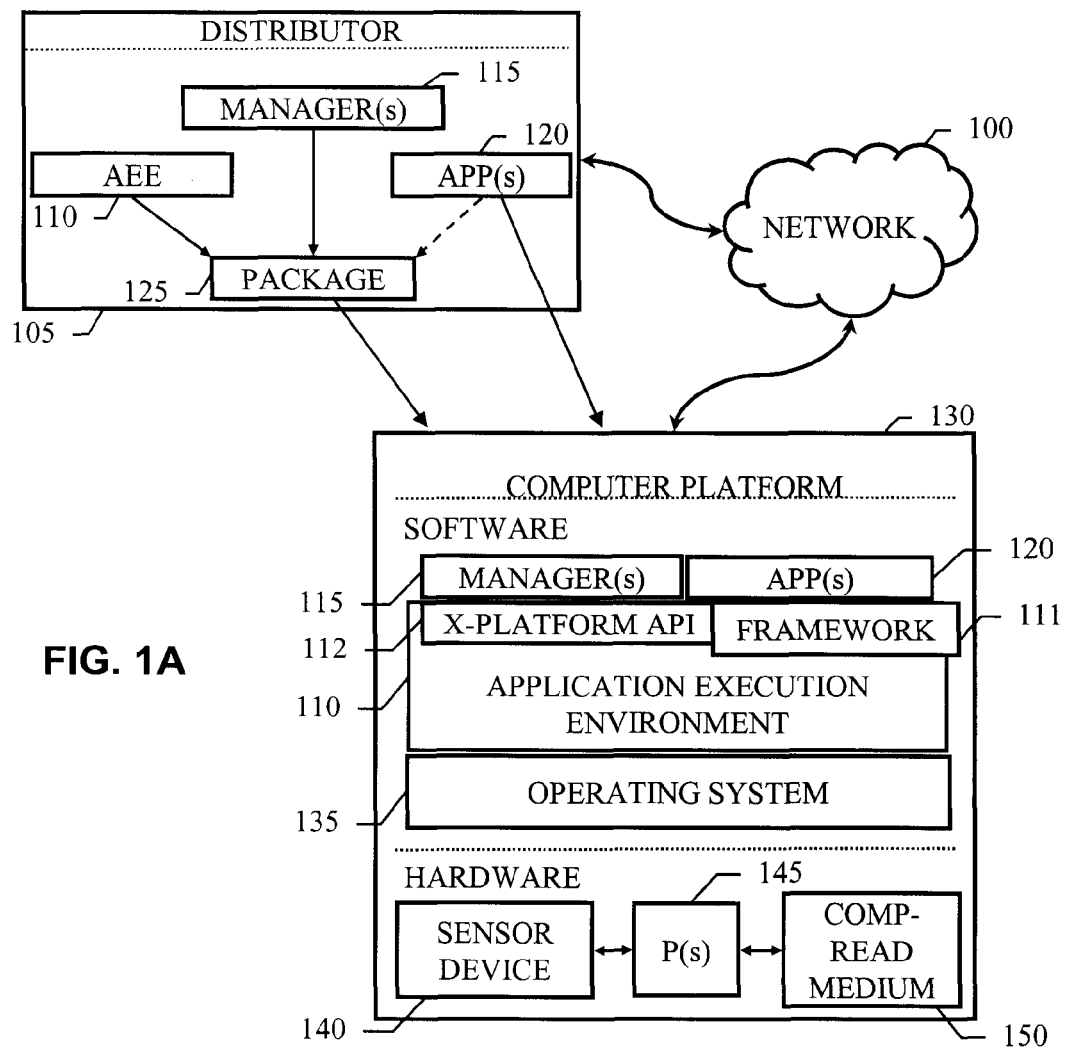
FIG. 1A shows an example system for abstracting data acquisition and management.

FIG. 1A shows an example system for abstracting data acquisition and management. A distributor 105 can provide an application execution environment (AEE) program 110, one or more AEE manager programs 115 (e.g., one or more installers and version management console programs), and one or more software applications 120 to be installed on a target computer 130. The distributor 105 makes an installer package 125 available for use installing one or more software programs on the computer 130. The installer package 125 can be a digitally signed document, where the signature is validated before the installer package 125 is used further. The installer package 125 can include an AEE installer and the AEE program. In addition, the installer package 125 can include one or more applications 120, or references to such, for installation along with the application execution environment program 110.

The distributor 105 can be a software developer, publisher, reseller, or other entity which distributes software, or the computers used by such. For example, the distributor 105 can be a server or server cluster providing software download facilities over a network 100, such as Local Area Networks, peer to peer networks, wireless networks, the Internet and the World Wide Web. The application execution environment program 110 and applications 120 can be distributed separately by multiple parties. The installer package 125 can also be distributed on physical media, such as Compact Discs (CDs), Digital Versatile Discs (DVDs) and floppy disks, or by other techniques that can be used to deliver digital content.

The target computer 130 includes both hardware and software. The hardware includes input/output devices (not shown), one or more real-time sensor devices 140, one or more processors 145 and at least one computer readable medium 150 (e.g., memory device(s), a storage device(s), or combinations of one or more of them). The software can include an operating system 135 on which the software elements provided by the distributor 105 operate. The application execution environment 110 can use the operating system 135 to interact with other elements of the computer 130. The application execution environment 110 can provide various utility services for use by applications that run in the application execution environment. These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provided using a runtime library. Moreover, the application execution environment 110 can include a cross-platform application program interface (API) 112 that provides services to applications that run in the application execution environment and serves to abstract away details of the various hardware and OS platforms on which the application execution environment program 110 has been designed to run.

Thus, the application execution environment (AEE) 110 can be a cross-platform runtime environment, such as the Adobe® Integrated Runtime (AIR™) software, provided by Adobe Systems Inc. of San Jose, Calif. In some implementations, the application execution environment 110 can load an application from an encoded representation of the application. For example, the encoded representation can have a predefined syntactic structure such as a programming language (e.g., source code) or can include well defined virtual instructions (e.g., platform-independent bytecode, such as Macromedia Flash® bytecode). To load such applications, the application execution environment 110 can decode the encoded representation of the application into instructions and can execute the instructions of the application.

In addition to serving as an application execution environment, the AEE 110 can also serve as an application installation environment, both for itself and the applications 120 that run on the AEE 110, and as a version management environment for itself. The user interface and language facilities of the AEE 110 (e.g., HTML, MXML (Multimedia eXtensible Markup Language), and scripting support, such as for ActionScript and JavaScript) can be used when writing a management console program 115 for the AEE 110.

The extent of the install/uninstall facilities to be put into the AEE 110 can vary among implementations. In some cases, the AEE 110 can provide APIs that perform all installation operations, based on requests from one or more appropriate installers. In other cases, some installation operations can be provided in the one or more installers/managers, and lower level API's of the runtime (e.g., file system access API) can be used to complete the installation operations on the computer 130. In any event, a version management console program can employ the install/uninstall facilities of the AEE to manage which versions of the AEE are installed and registered on a computer, either automatically during an installation of the AEE (e.g., when a new version of the AEE is installed), or upon user request (e.g., when the user selects a management option presented for the AEE in a control panel for installed programs).

The AEE 110 can also include a framework 111, which is reusable code provided along with an application 120. The framework 111 can be native code, cross-platform code, or both, which can be packaged along with the AEE 110 and then forms part of the AEE 110. For example, the framework 111 can be cross-platform code (e.g., ActionScript code) that translates between code in the application 120 (e.g., code in MXML, which is a user interface markup language first introduced by Macromedia in March 2004) and the API's 112 of the AEE 110. Thus, even when the framework 111 is delivered separate from the AEE 110 (e.g., delivered with an application 120), the framework 111 can integrate with the AEE 110, define at least a portion of the API 112, and thereafter form part of the AEE 110.

In any event, the application(s) 120 can request access to a real-time sensor device 140 through the cross-platform API 112 of the AEE 110. This request can be made without any knowledge of whether, or which type of, a sensor device is present. If no real-time sensor device is available, the requesting application 120 can be informed of this by the application execution environment. If a real-time sensor device is available, the requesting application 120 can be provided data from the device as described in further detail below. Note that the request from an application 120 can be specific to a given type of real-time sensor device (e.g., an accelerometer device), without requiring any knowledge of the various types of possible accelerometer devices on different computer platforms. In fact, a separate interface can be provided for each general type of real-time input device, e.g., accelerometer, touch screen, microphone, mouse, gyroscope, thermometer, camera, etc.

Moreover, the API 112 can employ static properties such that the programmer need not initialize the API 112 to use it. Rather, the programmer can simply begin by querying the properties of the API 112 to get the data desired. If initialization is needed, the AEE 110 can autodetect the first time the API 112 is accessed with respect to the sensor device and handle any initialization accordingly. Moreover, the API 112 can be designed to integrate data from multiple devices, which may be the same type of devices or different devices. For example, the API 112 can be configured to provide GPS coordinates and a camera image at the same time, and the API 112 can be configured to provide data from multiple accelerometers at the same time.

Figure 1B:
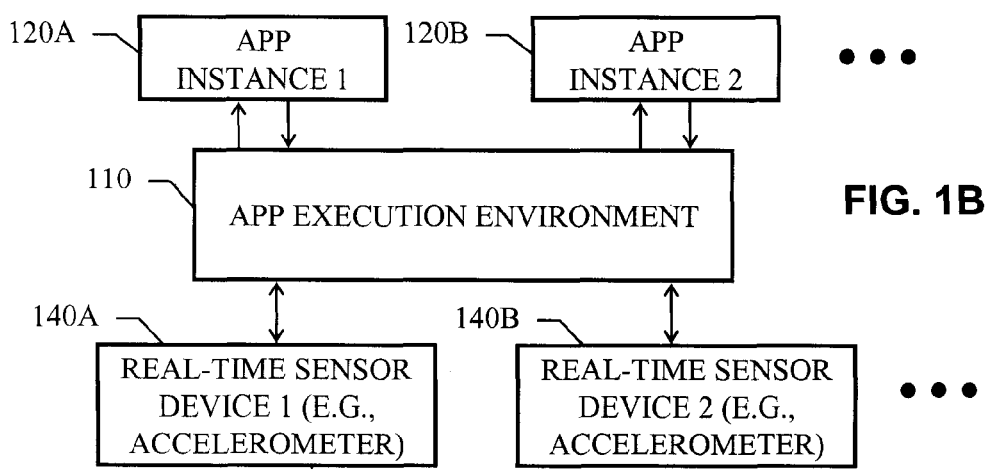
FIG. 1B shows example elements useable by the system shown in FIG. 1A.

FIG. 1B shows example elements useable by the system shown in FIG. 1A. Each instance of an application 120 can be treated separately by the AEE 110. Thus, a first instance 120A of an application can send a request to the AEE 110, and the AEE 110 can, in response, identify which of multiple predetermined sensor devices 140A, 140B is currently available. The AEE 110 can include information regarding many different known types of sensor devices (e.g., different know types of accelerometers) that are used in various computer platforms, and the AEE 110 can check for all such known devices, or the AEE 110 can check for each known device from an appropriate subset of such devices (e.g., based on the actual computer platform at hand). If one of the sensor devices 140A, 140B is currently available, the AEE 110 can then provide data back to the first instance 120A of the application, as described further below. Moreover, when a second instance 120B of the application (which can be running at the same time as the first instance 120A or at another time) is begun and sends its request, the AEE 110 can repeat the sensor device identification process. Thus, an available sensor device can be identified dynamically at runtime in response to each new request, and this identification can be based in part on the request and the requesting application instance.

Figure 2:
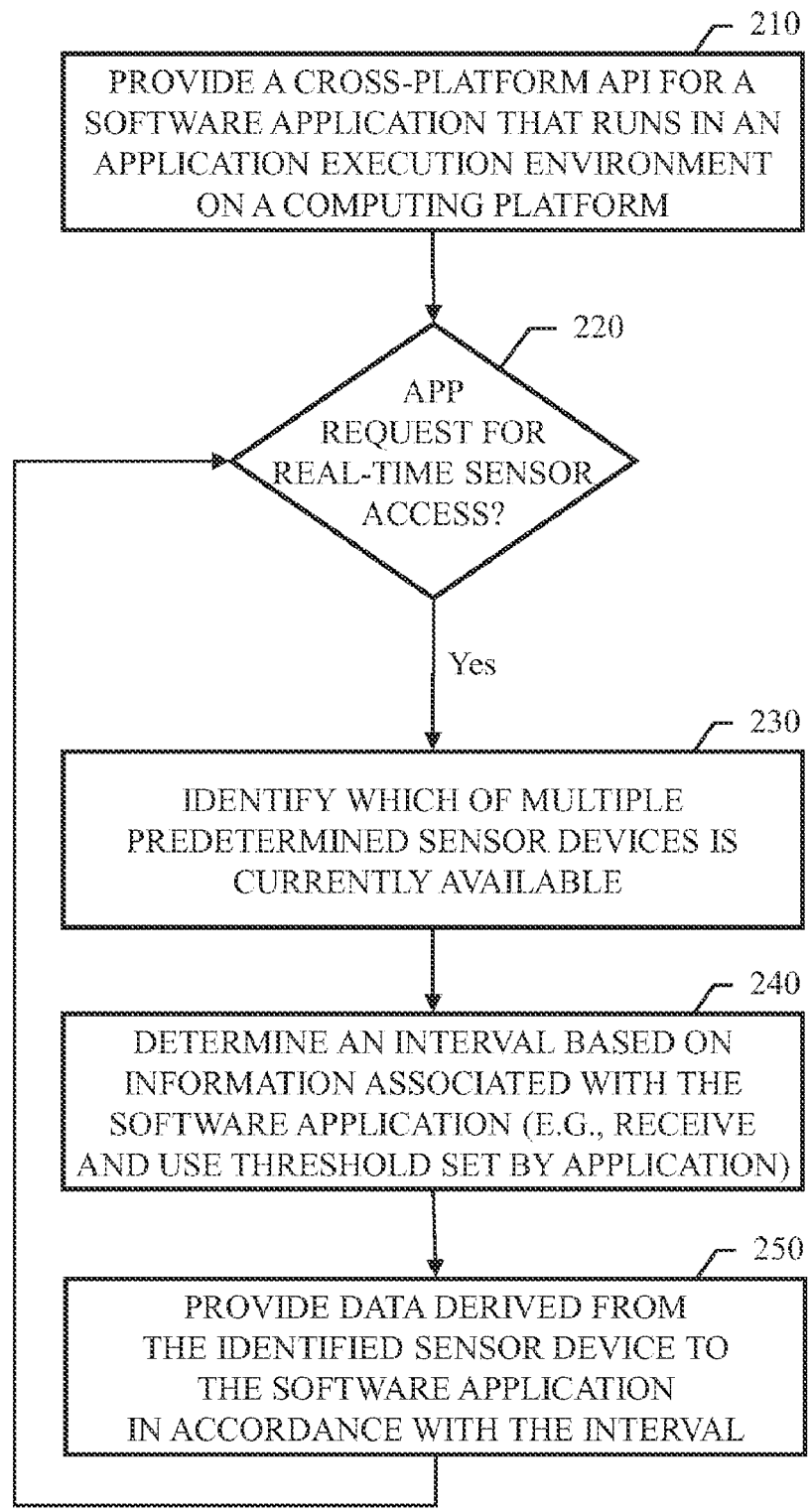
FIG. 2 shows an example process of abstracting data acquisition and management.

FIG. 2 shows an example process of abstracting data acquisition and management. A cross-platform application program interface can be provided 210 for a software application that runs in an application execution environment running on a computing platform. As discussed above, providing the cross-platform application program interface can involve providing a software framework that defines at least a portion of the cross-platform application program interface for the application execution environment.

The cross-platform application program interface can provide a facility by which the software application can submit a request for access to a real-time sensor device. When such a request is received 220, the application execution environment can perform a series of operations in response, as detailed below. In addition, this series of operations can be performed in response to each new request received, such as two requests received from different instances of the same application.

Which of multiple predetermined sensor devices is currently available can be identified 230, where the identified sensor device is configured to provide real-time data. Identifying 230 whether or not a known sensor device is currently available can involve attempting to load a library that provides a programming interface to the sensor device in the computing platform. Another approach includes attempting to send commands directly to the device through one or more OS calls to determine if a device is present and functioning the manner expected. Alternatively, on some computing platforms, the OS may not perform any mediation, and the hardware may be accessed directly. In any case, the AEE 110 and the API 112 contain code that enables access to multiple sensor devices of the same type (e.g., multiple accelerometers). Thus, the particular sensor device present at a given time can be identified 230 by checking for all known sensor devices to see which are present and operational.

An interval can be determined 240 based on information associated with the software application. The determining 240 can involve receiving the information including a threshold, and finding an end to the interval when a current value from the sensor device exceeds the threshold. For example, the programmer can write an application that specifies the threshold, and the interval can vary in accordance with the observed data from the sensor device in relation to that threshold. Alternatively, the application can specify a rate at which to poll the sensor device, or specify polling on demand.

Data derived from the identified sensor device can be provided 250 to the software application in accordance with the interval. The providing 250 can involve polling the identified sensor device, and sending the real-time data to the software application. This can involve sending all of the real-time data, sending portions of the real-time data, or sending data resulting from further processing of the real-time data by the AEE 110.

The above series of operations can be performed for each new application session, where the AEE 110 stores the discovered sensor device information for the remainder of the current session. If the application gets restarted, or if a different application is run, the AEE 110 can identify available sensor devices again in the context of the newly running application. In addition, since the state need only be specific to a given application's instance lifetime, the discovered information can be retained in volatile memory, rather than permanent storage.

Figure 3:
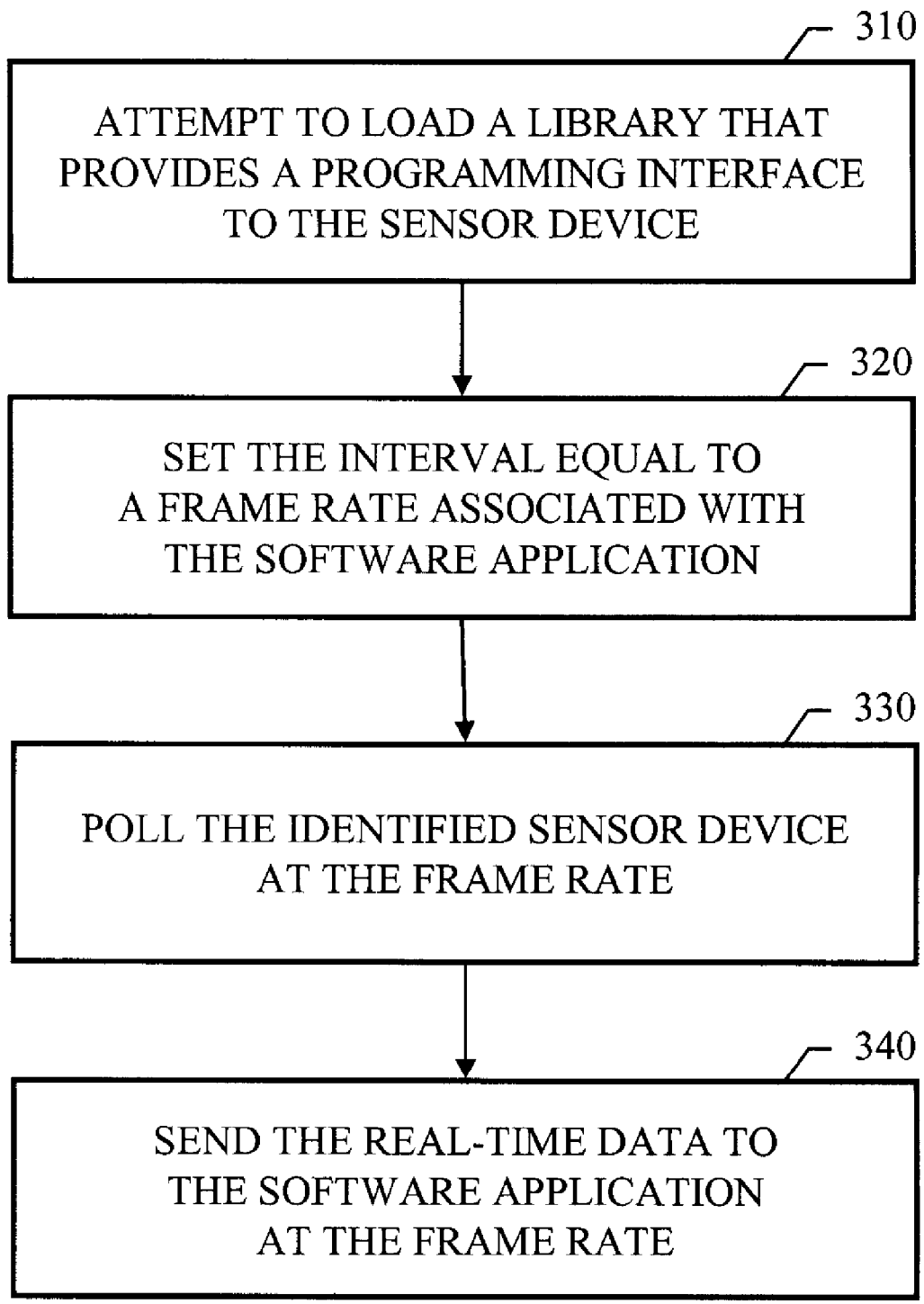
FIG. 3 shows another example process of abstracting data acquisition and management.

FIG. 3 shows another example process of abstracting data acquisition and management. A load attempt 310 can be made for a library that provides a programming interface to the sensor device in the computing platform. If the load attempt fails, that specific sensor device is presumed to not be present. If the load attempt succeeds and a call to the programming interface returns data, the data returned can be presumed to be valid and from the sensor device.

An interval can be set 320 to be equal to a frame rate associated with the software application. The AEE 110 can provide a defined frame rate (e.g., twenty four frames per second) at which the applications 120 run. The defined frame rate can be set by the AEE 110 or by a programmer. Moreover, each application 120 can have its own defined frame rate. In some implementations, the frame rate for an application 120 can be stored in one of the files that makes up the application. For example, in a Shockwave Flash (SWF) based application, the frame rate can be stored in the SWF itself. In some implementations, the frame rate for an application 120 can be set via the API 112. If the frame rate is changed via the API, then the API 112 can also change the rate at which it delivers data to match.

The identified sensor device can be polled 330 at the frame rate. The AEE 110 can set an event handler on the frame rate in response to an application's request, and poll the accelerometer as part of that event handler. Thus, new data is obtained at the same rate that the application is updated to the display system by the AEE 110. In this fashion, the polling is as fast as needed to provide a smooth update of the applications use of the data, without requiring excess processing; the polling need not be performed faster than necessary.

The real-time data can be sent 340 to the software application at the frame rate. Thus, the application 120 can register for an event to be delivered on every frame. The delivered data need not be calibrated and need not have associated units of measure. Alternatively, the delivered data can be calibrated or otherwise further process; for example, the delivered data can be a moving average of the actual input data from the sensor device. The delivered data can include multiple values for a single time slice, such as two or three values in the case of an accelerometer. For example, with an accelerometer, three values can be provided, where the first two values represent the X axis and Y axis data, and the third value represents the Z axis data if present (a zero can be provided here if the Z axis is not measured by the accelerometer).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, various mobile and other devices (e.g., having embedded operating systems) can also be supported.

What is claimed is:

1. A method comprising:
providing a cross-platform application program interface for a software application that runs in an application execution environment running on a computing platform;
receiving a request, through the cross-platform application program interface, from the software application for access to a real-time sensor device; and
in response to the request,
identifying which of multiple predetermined sensor devices is currently available, the identified sensor device being configured to provide real-time data,
determining an interval based on information associated with the software application, and
providing data derived from the identified sensor device to the software application in accordance with the interval.

2. The method of claim 1, wherein the providing the cross-platform application program interface comprises providing a software framework that defines at least a portion of the cross-platform application program interface for the application execution environment.

3. The method of claim 1, wherein the receiving comprises receiving a first request from a first instance of the software application, the method further comprising receiving a second request from a second instance of the software application, and in response to the second request,
- identifying which of the multiple predetermined sensor devices is currently available,
- determining a second interval based on information associated with the second instance of the software application, and
- providing the data from the identified sensor device to the second instance of the software application in accordance with the second interval.

4. The method of claim 1, wherein the identifying comprises attempting to load a library that provides a programming interface to a sensor device in the computing platform.

5. The method of claim 1, wherein the determining comprises setting the interval equal to a frame rate associated with the software application.

6. The method of claim 5, wherein the providing the data comprises:
- polling the identified sensor device at the frame rate; and
- sending the real-time data to the software application at the frame rate.

7. The method of claim 6, wherein each of the multiple predetermined sensor devices comprises an accelerometer.

8. The method of claim 1, wherein the determining comprises:
- receiving the information comprising a threshold; and
- finding an end to the interval when a current value from the sensor device exceeds the threshold.

9. A computer-readable medium encoding a computer program product operable to cause data processing apparatus to perform operations comprising:
- providing a cross-platform application program interface for a software application that runs in an application execution environment running on a computing platform;
- receiving a request, through the cross-platform application program interface, from the software application for access to a real-time sensor device; and
- in response to the request,
  - identifying which of multiple predetermined sensor devices is currently available, the identified sensor device being configured to provide real-time data,
  - determining an interval based on information associated with the software application, and
  - providing data derived from the identified sensor device to the software application in accordance with the interval.

10. The computer-readable medium of claim 9, wherein the providing the cross-platform application program interface comprises providing a software framework that defines at least a portion of the cross-platform application program interface for the application execution environment.

11. The computer-readable medium of claim 9, wherein the receiving comprises receiving a first request from a first instance of the software application, the operations further comprising receiving a second request from a second instance of the software application, and in response to the second request,
- identifying which of the multiple predetermined sensor devices is currently available,
- determining a second interval based on information associated with the second instance of the software application, and
- providing the data from the identified sensor device to the second instance of the software application in accordance with the second interval.

12. The computer-readable medium of claim 9, wherein the identifying comprises attempting to load a library that provides a programming interface to a sensor device in the computing platform.

13. The computer-readable medium of claim 9, wherein the determining comprises setting the interval equal to a frame rate associated with the software application.

14. The computer-readable medium of claim 13, wherein the providing the data comprises:
- polling the identified sensor device at the frame rate; and
- sending the real-time data to the software application at the frame rate.

15. The computer-readable medium of claim 14, wherein each of the multiple predetermined sensor devices comprises an accelerometer.

16. The computer-readable medium of claim 9, wherein the determining comprises:
- receiving the information comprising a threshold; and
- finding an end to the interval when a current value from the sensor device exceeds the threshold.

17. A system comprising:
- a user interface device; and
- one or more computers operable to interact with the user interface device and to perform operations comprising:
  - providing a cross-platform application program interface for a software application that runs in an application execution environment running on a computing platform;
  - receiving a request, through the cross-platform application program interface, from the software application for access to a real-time sensor device; and
  - in response to the request,
    - identifying which of multiple predetermined sensor devices is currently available, the identified sensor device being configured to provide real-time data,
    - determining an interval based on information associated with the software application, and
    - providing data derived from the identified sensor device to the software application in accordance with the interval.

18. The system of claim 17, wherein the providing the cross-platform application program interface comprises providing a software framework that defines at least a portion of the cross-platform application program interface for the application execution environment.

19. The system of claim 17, wherein the receiving comprises receiving a first request from a first instance of the software application, the operations further comprising receiving a second request from a second instance of the software application, and in response to the second request,
- identifying which of the multiple predetermined sensor devices is currently available,
- determining a second interval based on information associated with the second instance of the software application, and
- providing the data from the identified sensor device to the second instance of the software application in accordance with the second interval.

20. The system of claim 17, wherein the identifying comprises attempting to load a library that provides a programming interface to a sensor device in the computing platform.

21. The system of claim 17, wherein the determining comprises setting the interval equal to a frame rate associated with the software application.

22. The system of claim 21, wherein the providing the data comprises:
   polling the identified sensor device at the frame rate; and
   sending the real-time data to the software application at the frame rate.

23. The system of claim 22, wherein each of the multiple predetermined sensor devices comprises an accelerometer.

24. The system of claim 17, wherein the determining comprises:
   receiving the information comprising a threshold; and
   finding an end to the interval when a current value from the sensor device exceeds the threshold.

25. The system of claim 17, wherein the one or more computers comprises one personal computer, and the personal computer comprises the user interface device.

* * * * *